(12) United States Patent
Zanzucchi

(10) Patent No.: US 6,443,409 B1
(45) Date of Patent: Sep. 3, 2002

(54) ATTACHABLE CLIP DEVICE

(76) Inventor: John T. Zanzucchi, 9924 Kika Ct. Apt 2415, San Diego, CA (US) 92129

( * ) Notice: Subject to any disclaimer, the term of this patent is extended or adjusted under 35 U.S.C. 154(b) by 0 days.

(21) Appl. No.: 09/849,426

(22) Filed: May 4, 2001

(51) Int. Cl.[7] .............................................. A47B 96/06
(52) U.S. Cl. ................................. 248/218.3; 248/216.1
(58) Field of Search ......................... 248/218.3, 231.91, 248/304, 216.1, 216.4

(56) References Cited

U.S. PATENT DOCUMENTS

| | | | | |
|---|---|---|---|---|
| 1,099,741 A | * | 6/1914 | Ford | .......................... 248/489 |
| 1,292,956 A | * | 1/1919 | McConnal | .................. 248/549 |
| 1,999,218 A | * | 4/1935 | Tiryakian | .................... 248/22 |
| 2,631,804 A | | 3/1953 | Uhlhorn | |
| 3,224,721 A | * | 12/1965 | Malmquist | .................. 248/339 |
| 3,513,747 A | | 5/1970 | Dirks | |
| 3,861,631 A | | 1/1975 | Shorin | |
| 3,995,821 A | | 12/1976 | Einhorn | |
| D310,954 S | | 10/1990 | Persaud | |
| 5,096,149 A | * | 3/1992 | Riese | ....................... 248/216.1 |
| 5,118,061 A | * | 6/1992 | Byrne et al. | .............. 248/231.9 |
| 5,148,581 A | * | 9/1992 | Hartmann | ..................... 24/351 |
| 5,484,126 A | * | 1/1996 | Kitchin | ..................... 248/217.3 |
| 5,507,459 A | * | 4/1996 | Kiera | ....................... 248/218.2 |
| 5,549,234 A | | 8/1996 | Hong | |
| 5,621,950 A | * | 4/1997 | White | ........................ 24/67.5 |
| 6,126,126 A | * | 10/2000 | McKiernan, Jr. | ......... 248/217.3 |
| 6,273,380 B1 | * | 8/2001 | Fillipp et al. | ........... 248/231.91 |

* cited by examiner

*Primary Examiner*—Ramon O. Ramirez
*Assistant Examiner*—Kofi Schulterbrandt

(57) ABSTRACT

An attachable clip device for allowing items to be hung from a pushpin. The attachable clip device includes a shaft having a top end; and also includes a fastener support member being attached at the top end of the shaft; and further includes a fastener being securely attached to the fastener support member.

7 Claims, 4 Drawing Sheets

ATTACHABLE CLIP DEVICE

BACKGROUND OF THE INVENTION

1. Field of the Invention

The present invention relates to tackable fasteners and more particularly pertains to a new attachable clip device for allowing items to be hung from a pushpin.

2. Description of the Prior Art

The use of tackable fasteners is known in the prior art. More specifically, tackable fasteners heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 3,995,821; 3,861,631; 3,513,747; 2,631,804; 5,549,234; and U.S. Patent No. Des. 310,954.

While these devices fulfill their respective, particular objectives and requirements, the aforementioned patents do not disclose a new attachable clip device. The inventive device includes a shaft having a top end; and also includes a fastener support member being attached at the top end of the shaft; and further includes a fastener being securely attached to the fastener support member.

In these respects, the attachable clip device according to the present invention substantially departs from the conventional concepts and designs of the prior art, and in so doing provides an apparatus primarily developed for the purpose of allowing items to be hung from a pushpin.

SUMMARY OF THE INVENTION

In view of the foregoing disadvantages inherent in the known types of tackable fasteners now present in the prior art, the present invention provides a new attachable clip device construction wherein the same can be utilized for allowing items to be hung from a pushpin.

The general purpose of the present invention, which will be described subsequently in greater detail, is to provide a new attachable clip device which has many of the advantages of the tackable fasteners mentioned heretofore and many novel features that result in a new attachable clip device which is not anticipated, rendered obvious, suggested, or even implied by any of the prior art tackable fasteners, either alone or in any combination thereof.

To attain this, the present invention generally comprises a shaft having a top end; and also includes a fastener support member being attached at the top end of the shaft; and further includes a fastener being securely attached to the fastener support member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new attachable clip device which has many of the advantages of the tackable fasteners mentioned heretofore and many novel features that result in a new attachable clip device which is not anticipated, rendered obvious, suggested, or even implied by any of the prior art tackable fasteners, either alone or in any combination thereof.

It is another object of the present invention to provide a new attachable clip device which may be easily and efficiently manufactured and marketed.

It is a further object of the present invention to provide a new attachable clip device which is of a durable and reliable construction.

An even further object of the present invention is to provide a new attachable clip device which is susceptible of a low cost of manufacture with regard to both materials and labor, and which accordingly is then susceptible of low prices of sale to the consuming public, thereby making such attachable clip device economically available to the buying public.

Still yet another object of the present invention is to provide a new attachable clip device which provides in the apparatuses and methods of the prior art some of the advantages thereof, while simultaneously overcoming some of the disadvantages normally associated therewith.

Still another object of the present invention is to provide a new attachable clip device for allowing items to be hung from a pushpin.

Yet another object of the present invention is to provide a new attachable clip device which includes a shaft having a top end; and also includes a fastener support member being attached at the top end of the shaft; and further includes a fastener being securely attached to the fastener support member.

Still yet another object of the present invention is to provide a new attachable clip device that is easy and convenient to use.

Even still another object of the present invention is to provide a new attachable clip device that allows the hanging of objects from wall structures without any damage being done to the wall structures.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
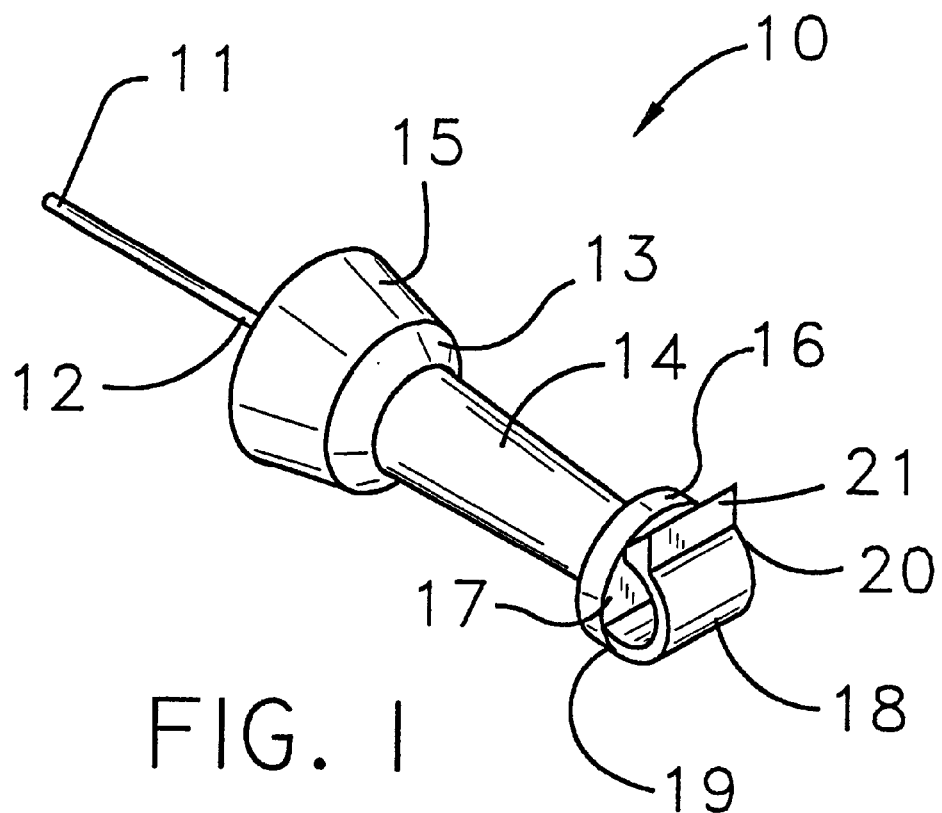
FIG. 1 is a perspective view of a first embodiment of a new attach clip device according to the present invention.
Figure 2:
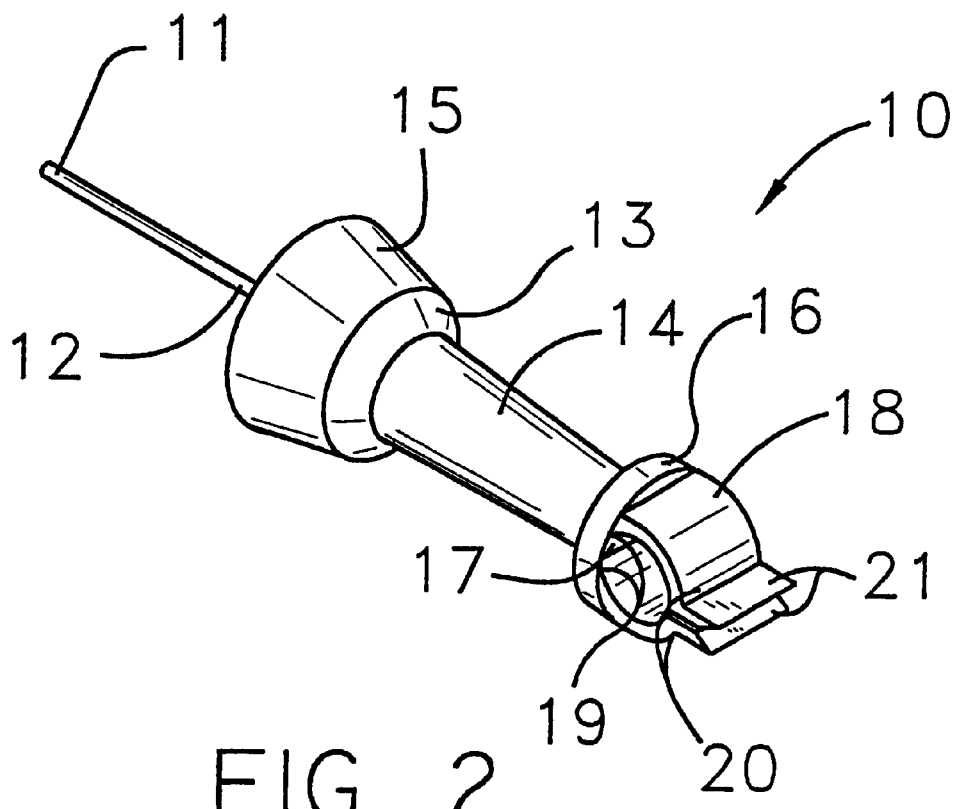
FIG. 2 is a perspective view of a second embodiment of the present invention.
Figure 3:
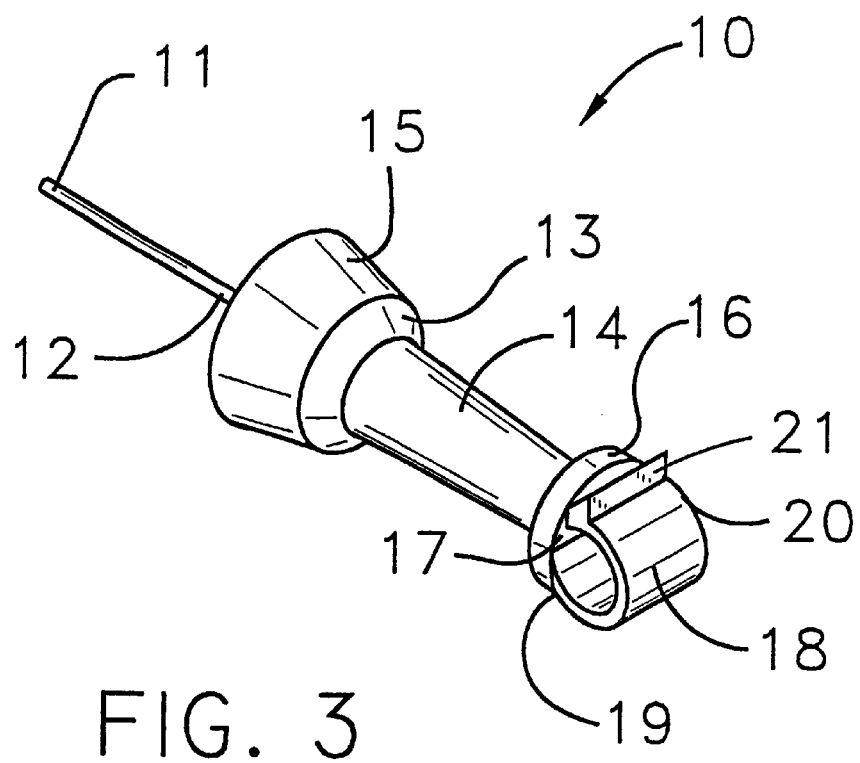
FIG. 3 is a perspective view of a third embodiment of the present invention.
Figure 4:
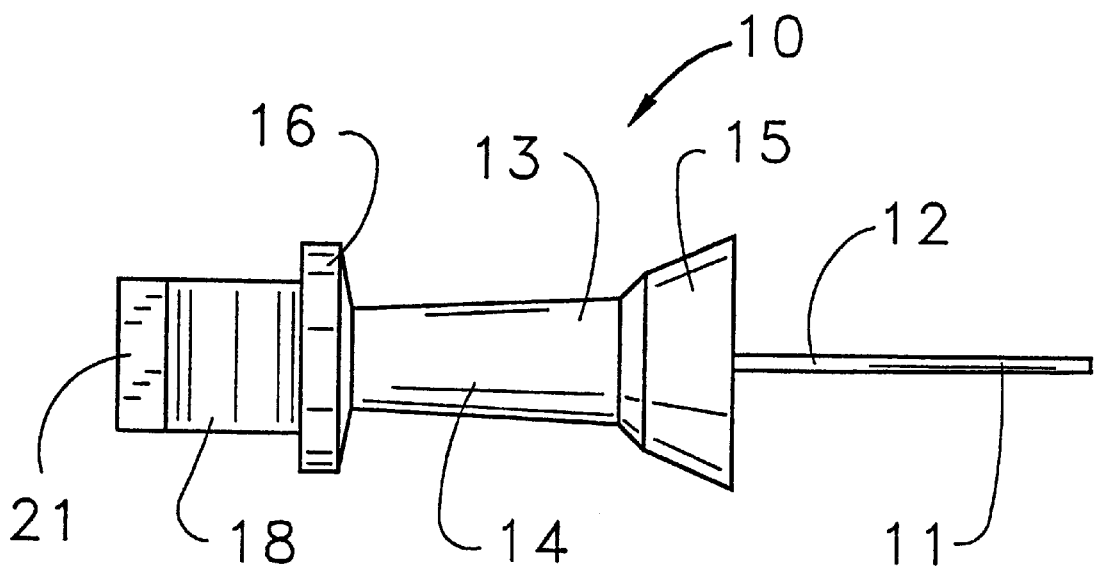
FIG. 4 is a side elevational view of the second embodiment of the present invention.
Figure 5:
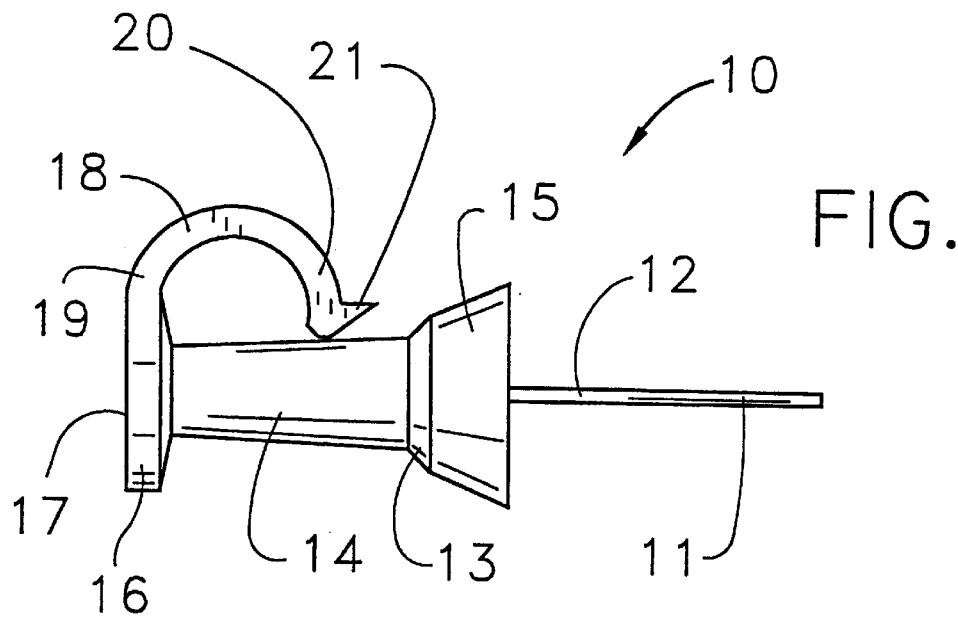
FIG. 5 is a side perspective view of a fourth embodiment of the present invention.
Figure 6:
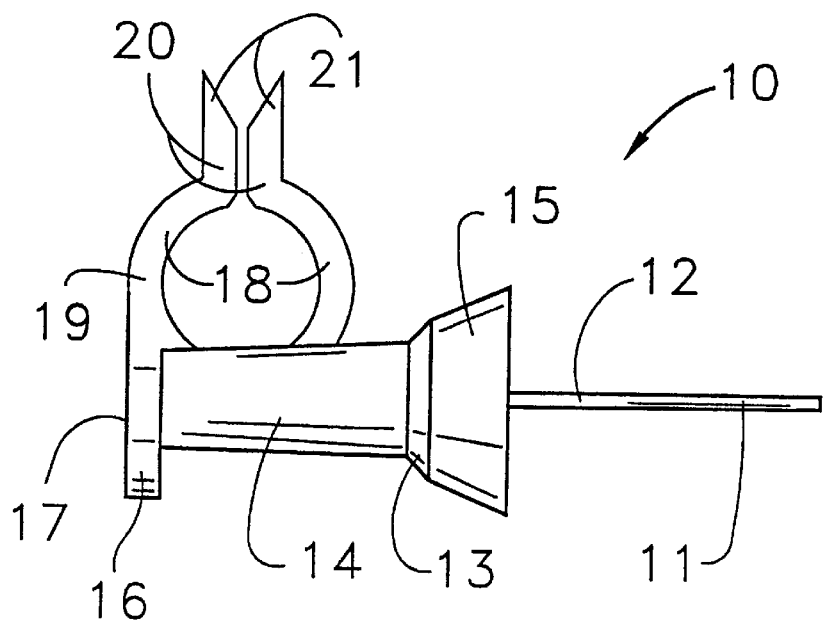
FIG. 6 is a side perspective view of a fifth embodiment of the present invention.
Figure 7:
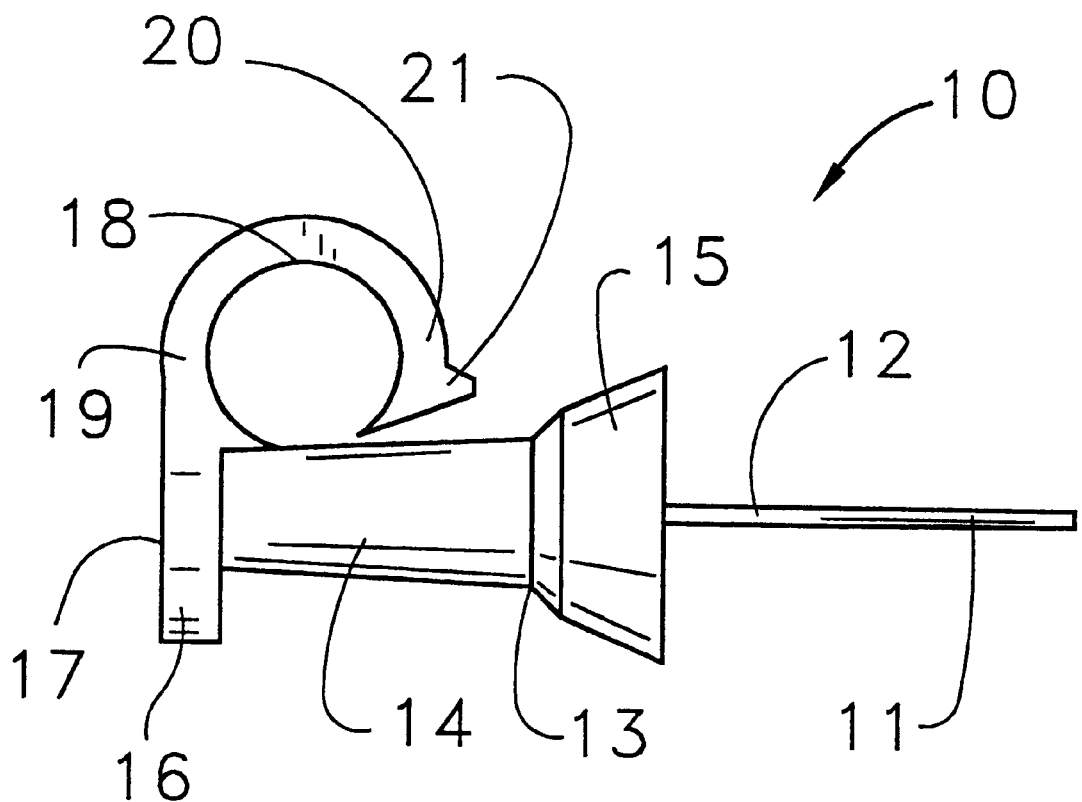
FIG. 7 is a side perspective view of a sixth embodiment of the present invention.

With reference now to the drawings, and in particular to FIGS. 1 through 7 thereof, a new attachable clip device embodying the principles and concepts of the present invention and generally designated by the reference numeral 10 will be described.

As best illustrated in FIGS. 1 through 7, the attachable clip device 10 generally comprises a shaft 11 having a top end 12 and having a length of approximately $^{45}/_{100}$ of an inch. A fastener support member 13 is conventionally attached at the top end 12 of the shaft 11. The fastener support member 13 includes a tubular main portion 14, and also includes a skirt-shaped bottom portion 15, and further includes a disc-shaped top portion 16 having a flat top surface 17. The shaft 11 is conventionally attached to the skirt-shaped bottom portion 15 with the fastener support member 13 having a length of approximately $^{46}/_{100}$ of an inch.

A fastener is securely and conventionally attached to the fastener support member 13. The fastener includes at least one arcuate jaw member 18 having at least one first end 19 being securely and conventionally attached to the fastener support member 13 for holding an object, and also includes at least one flange member 21 being conventionally attached to the at least one arcuate jaw member 18 and being adapted to be grasped by a user's finger to bend and open the at least one arcuate jaw member 18.

As a first, second and third embodiments, the at least one arcuate jaw member 18 is conventionally attached to the flat top surface 17 of the disc-shaped top portion 16. In addition, as the second embodiment, the at least one arcuate jaw member 18 includes a pair of opposed arcuate jaw members 18 having second ends 20, and the at least one flange member 21 includes a pair of flange members 21 being conventionally attached to the second ends 20 of the arcuate jaw members 18 and being biasedly and spreadably engaged to one another.

As a fourth, fifth, and sixth embodiments, the at least one arcuate jaw member 18 is conventionally attached to a side of the fastener support member 13. The at least one arcuate jaw member 18 includes a pair of opposed arcuate jaw members 18 having second ends 20 with one of the arcuate jaw members 18 being attached to the tubular main portion 14 and with the other of the arcuate jaw members 18 being attached to the disc-shaped top portion 16, and the at least one flange member 21 includes a pair of flange members 21 being conventionally attached to the second ends 20 of the arcuate jaw members 18 and being spreadably and biasedly engaged to and one another.

In use, the user inserts the shaft 11 into a wall structure and clips objects to the fastener such as Christmas tree lights and pictures. The at least one jaw member 18 engages the objects.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An attachable clip device comprising:

a shaft having a top end;

a fastener support member being attached at said top end of said shaft; and a fastener being attached to said fastener support member;

wherein said fastener support member includes a main portion, a bottom portion, and a top portion having a flat top surface, said shaft being attached to said bottom portion;

wherein said fastener includes an arcuate jaw member having a first end attached to said fastener support member and at least one flange member attached to said jaw member; and wherein said arcuate jaw member is attached to a side surface of said fastener support member with one of said fastener being attached to said main portion and with the other of said arcuate jaw members being attached to said top portion.

2. An attachable clip device as described in claim 1, wherein said fastener support member includes a tubular main portion, and also includes a skirt-shaped bottom portion, and further includes a disc-shaped top portion having a flat top surface, said shaft being attached to said skirt-shaped bottom portion.

3. An attachable clip device as described in claim 2, wherein said fastener includes at least one arcuate jaw member having at least one first end being securely attached to said fastener support member, and also includes at least one flange member being attached to said at least one arcuate jaw member and being adapted to be grasped by a user's finger to bend and open said at least one arcuate jaw member.

4. An attachable clip device comprising;

a shaft having a top end;

a fastener support member being attached at said top end of said shaft; and a fastener being securely attached to said fastener support member;

wherein said fastener support member includes a tubular main portion, and also includes a skirt-shaped bottom portion, and further includes a disc-shaped top portion having a flat top surface, said shaft being attached to said skirt-shaped bottom portion;

wherein said fastener includes at least one arcuate jaw member having at least one first end being securely attached to said fastener support member, and also includes at least one flange member being attached to said at least one arcuate jaw member and being adapted to be grasped by a user's finger to bend and open said at least one arcuate jaw member;

wherein said at least one arcuate jaw member is attached to a side of said fastener support member with one of said arcuate jaw members being attached to said tubular main portion and with the other of said arcuate jaw members being attached to the disc-shaped top portion.

5. An attachable clip device as described in claim 4, wherein said at least one arcuate jaw member includes a pair of opposed arcuate jaw members having second ends, and said at least one flange member includes a pair of flange members being attached to said second ends of said arcuate jaw members and being spreadably and biasedly engaged to and one another.

6. An attachable clip device comprising:

a shaft having a top end and having a length of approximately $^{45}/_{100}$ of an inch;

a fastener support member being attached at said top end of said shaft said fastener support member including a tubular main portion, and also including a skirt-shaped bottom portion, and further including a disc-shaped top portion having a flat top surface said shaft being attached to said skirt-shaped bottom portion, said fastener support member having a length of approximately $^{46}/_{100}$ of an inch; and a fastener being securely attached to said fastener support member, said fastener including at least one arcuate jaw member having at least one first end being securely attached to said fastener support member for holding an object, and also including at least one flange member being attached to said at least one arcuate jaw member and being adapted to be grasped by a user's finger to bend and open said at least one arcuate jaw member;

wherein said at least one arcuate jaw member is attached to a side of said fastener support member with one of said arcuate jaw members being attached to said tubular main portion and with the other of said arcuate jaw members being attached to the disc-shaped top portion, said at least one arcuate jaw member including a pair of opposed arcuate jaw members having second ends, and said at least one flange member includes a pair of flange members being attached to said second ends of said arcuate jaw members and being spreadably and biasedly engaged to and one another.

7. An attachable clip device as described in claim 1, wherein said at least one arcuate jaw member includes a pair of opposed arcuate jaw members having second ends, and said at least one flange member includes a pair of flange members being attached to said second ends of said arcuate jaw members and being spreadably and biasedly engaged to and one another.

* * * * *